United States Patent
Wang

(10) Patent No.: US 10,776,179 B2
(45) Date of Patent: Sep. 15, 2020

(54) MULTI-APPLICATION-ORIENTED USER DATA MANAGEMENT METHOD AND SYSTEM

(71) Applicant: INTELLIGENT BUSINESS SOFTWARE (BEIJING) CO., LTD, Beijing (CN)

(72) Inventor: Haining Wang, Beijing (CN)

(73) Assignee: INTELLIGENT BUSINESS SOFTWARE (BEIJING) CO., LTD, Beijing (CN)

(*) Notice: Subject to any disclaimer, the term of this patent is extended or adjusted under 35 U.S.C. 154(b) by 0 days.

(21) Appl. No.: 16/327,366

(22) PCT Filed: Jul. 24, 2017

(86) PCT No.: PCT/CN2017/094113
§ 371 (c)(1),
(2) Date: Feb. 22, 2019

(87) PCT Pub. No.: WO2018/036328
PCT Pub. Date: Mar. 1, 2018

(65) Prior Publication Data
US 2019/0220329 A1    Jul. 18, 2019

(30) Foreign Application Priority Data
Aug. 24, 2016    (CN) .......................... 2016 1 0721465

(51) Int. Cl.
*G06F 3/00*    (2006.01)
*G06F 9/54*    (2006.01)
(Continued)

(52) U.S. Cl.
CPC .............. *G06F 9/541* (2013.01); *G06F 21/30* (2013.01); *H04L 63/0884* (2013.01);
(Continued)

(58) Field of Classification Search
CPC ........................................................ G06F 9/54
(Continued)

(56) References Cited

U.S. PATENT DOCUMENTS 8,473,749 B1 *   6/2013   Madsen .................. H04L 67/34
                                                          713/187
9,537,865 B1 *   1/2017   Borovoy ............... H04L 63/108
(Continued)

FOREIGN PATENT DOCUMENTS

CN    101083527 A    12/2007
CN    104751030 A     7/2015
(Continued)

OTHER PUBLICATIONS

Nurith, A Model of Methods Access Authorization in Object-oriented Databases, (Year: 1993).*

*Primary Examiner* — Lechi Truong
(74) *Attorney, Agent, or Firm* — IPro, PLLC

(57) ABSTRACT

Disclosed in the present invention are a multi-application-oriented user data management method and system. The method comprises a first application module receives an access instruction input by a first user, the first application module generates an authority request information according to the access instruction, wherein the authority request information includes information of the first application corresponding to the first application module, a platform server or an authority data storage server calls a user authority data of the first application according to the authority request information, and return the user authority data to the first application module, and the first application module obtains user data orienting to the first user of the first application according to the user authority data and user information of the first user.

8 Claims, 4 Drawing Sheets

(51) Int. Cl.
  *G06F 21/30* (2013.01)
  *H04L 29/06* (2006.01)
  *H04L 29/08* (2006.01)

(52) U.S. Cl.
  CPC ............ *H04L 63/102* (2013.01); *H04L 67/26* (2013.01); *H04L 2463/101* (2013.01)

(58) Field of Classification Search
  USPC .......................................................... 719/310
  See application file for complete search history.

(56) References Cited

U.S. PATENT DOCUMENTS

| | | | | |
|---|---|---|---|---|
| 2004/0098595 | A1* | 5/2004 | Aupperle | H04L 63/083 713/185 |
| 2004/0125402 | A1* | 7/2004 | Kanai | G06F 21/608 358/1.15 |
| 2011/0083177 | A1* | 4/2011 | Eddahabi | G06F 21/10 726/19 |
| 2013/0290719 | A1* | 10/2013 | Kaler | G06F 21/41 713/168 |
| 2013/0312066 | A1* | 11/2013 | Suarez | G16H 40/67 726/4 |
| 2015/0121464 | A1* | 4/2015 | Hughes, Jr. | H04L 63/105 726/4 |
| 2016/0359861 | A1* | 12/2016 | Manov | H04L 63/102 |
| 2017/0004292 | A1* | 1/2017 | Pathak | G06Q 20/40 |
| 2017/0053120 | A1* | 2/2017 | Kamble | H04L 63/10 |
| 2019/0121999 | A1* | 4/2019 | Sinha | H04L 67/06 |

FOREIGN PATENT DOCUMENTS

| | | |
|---|---|---|
| CN | 104751077 A | 7/2015 |
| CN | 105450581 A | 3/2016 |
| CN | 106131064 A | 11/2016 |
| CN | 106325936 A * | 1/2017 |
| EP | 2552079 A1 | 1/2013 |

* cited by examiner

MULTI-APPLICATION-ORIENTED USER DATA MANAGEMENT METHOD AND SYSTEM

The present invention claims priority to the application No. 201610721465.5 entitled "Multi-application-oriented user data management method and system", which is submitted to National Intellectual Property Administration, PRC on Aug. 24, 2016.

TECHNICAL FIELD

The present invention relates to the technical field of data processing, in particular to a multi-application-oriented user data management method and system.

BACKGROUND

In the existing internet application development, the data among the applications have no interaction with each other, and the internal authority of applications cannot be managed unifiedly very well. Particularly, in the big data era, great trouble is brought to the management of user data. With the increase of the number of applications, other performance problems will be occurred.

SUMMARY OF THE INVENTION

Therefore, the present invention provides a multi-application-oriented user data management method and system, which manage applications developed on the base of the same platform, and push corresponding data to the application according to the needs of the application, and share data among the applications, therefore it achieves that the application authorities is managed unifiedly The first aspect, this embodiment provides a multi-application-oriented user data management method, comprising:

a first application module receives an access instruction input by a first user, the first application module generates an authority request information according to the access instruction, wherein the authority request information includes information of the first application corresponding to the first application module, a platform server or an authority data storage server calls a user authority data of the first application according to the authority request information, and return the user authority data to the first application module, and the first application module obtains user data orienting to the first user of the first application according to the user authority data and user information of the first user.

Preferred, before the first application module receives the access instruction input by the first user, the method further comprises:

an authorization management application module receives a user authority information, and the user authority information includes a user information, an application information, an authority information, the authorization management application module sends the user authority information to the platform server or the authority data storage server, the platform server or the authority data storage server stores the user authority information as the user authority data.

Further preferred, that the platform server calls the user authority data of the first application according to the authority request information, and returns the user authority data to the first application module includes the first application module receives the user authority information pushed by the platform server.

Further preferred, that the platform server calls the user authority data of the first application according to the authority request information, and return the user authority data to the first application module includes the first application module sends the authority request information to an authority service management server, the authority service management server obtains the user authority data from the platform server according to the authority request information.

Further preferred, that the platform server calls the user authority data of the first application according to the authority request information, and return the user authority data to the first application module includes, the platform server pushes the user authority data to the authority data storage server, the first application module sends the authority request information to the authority service management server, the authority service management server obtains the user authority data from the authority data storage server according to the authority request information.

The second aspect, this embodiment provides a multi-application-oriented user data management system, comprising, and the embodiment comprises: a user terminal and a platform server, a first application module is at less loaded on the user terminal;

the first application module is configured for to receiving an access instruction input by a first user, the first application module is further configured for generating an authority request information according to the access instruction, which includes information of a first application corresponding to the first application module, the platform server calls a user authority data of the first application according to the authority request information, and returns the user authority data to the first application module, the first application module is further configured for obtaining a user data of the first user orient to the first application according to the user authority data and user information of the first user.

Preferred, the user terminal is further loading with an authorization management application module, the authorization management application module is configured for receiving a user authority information, which includes a user information, an application information and an authority information, the authorization management application module is further configured for sending the user authority information to the platform server, the platform server is further configured for storing the user authority information as the user authority data.

Further preferred, the first application module is configured for receiving the user authority information pushed by the platform server.

Further preferred, the system further includes an authority service management server, the first application module is configured for sending the authority request information to the authority service management server, the authority service management server is configured for obtaining the user authority data from the platform server according to the authority request information.

Further preferred, the system further includes an authority data storage server and an authority service management server, the platform server is configured for pushing the user authority data to the authority data storage server, the first application module is configured for sending the authority request information to the authority service management server, the authority service management server is configured for obtaining the user authority data from the authority data storage server according to the authority request information.

The embodiment of the present invention provides a multi-application-oriented user data management method, which manages applications developed on the base of the same platform, and pushes corresponding data to the application according to the needs of the application and shares data among the applications, therefore it achieves that the application authorities is managed unifiedly. This method solves the problem that exist in the authorization of the discrete applications, and improve the degree of flexibility of the discrete applications, and the authority's number is reasonably controlled.

DETAILED DESCRIPTION OF THE INVENTION

In order to make the purpose, the technical scheme and the advantage of the present invention more clear, the present invention is further described in detail in combination with the figures, it is obviously that the described embodiments are only a part of embodiments of the invention, not all embodiments of the invention. And all of the other embodiments that obtained by an ordinary technician in the field of technology without inventive labor based on the embodiments of the present invention all belong to the claimed scope of the present invention.

The embodiments of the present invention provide a Multi-application-oriented user data management method, and the embodiments are applied to multi-application-oriented user data management system, and the developed applications orient to the system are based on the same platform.

The user data management system comprises a user terminal and a platform server. wherein the user terminal is loading with an authorization management application module and a first application module. The first application module refers to single program for some kind of application or a set of other slave elements of user.

Figure 1:
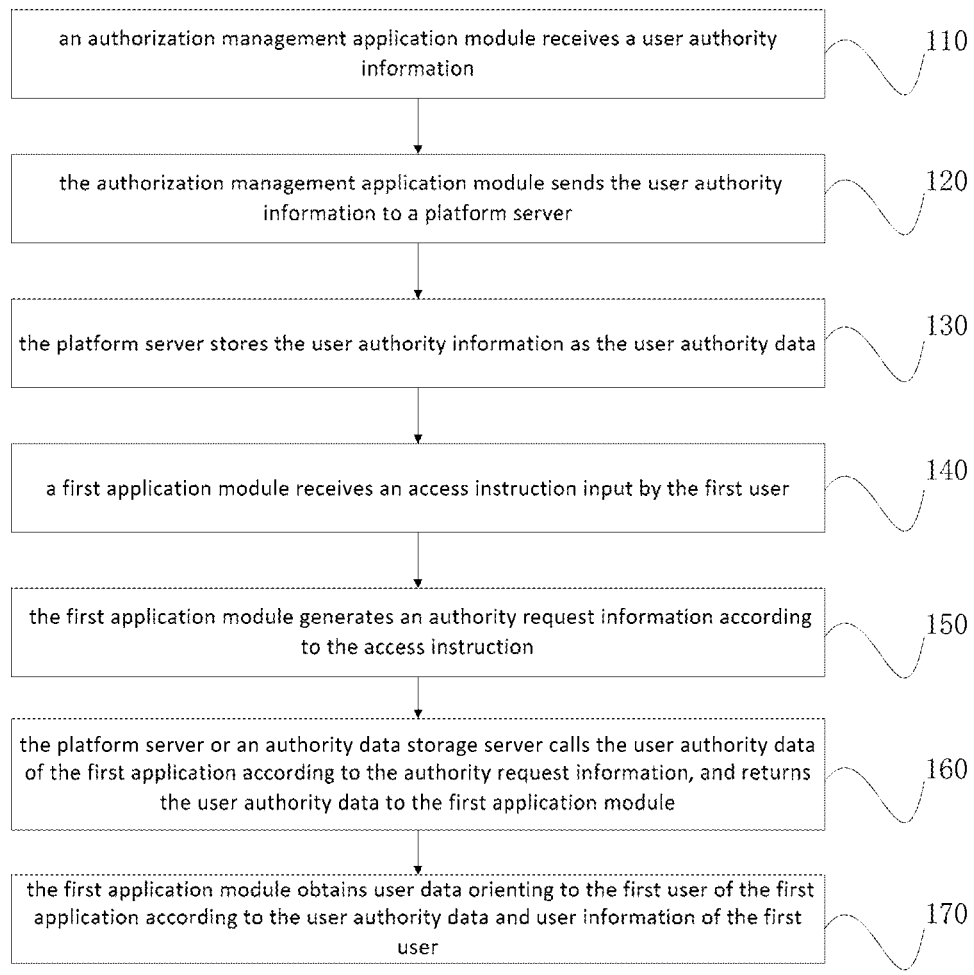
FIG. 1 is a flowchart illustrating a multi-application-oriented user data management method according to an embodiment of the present invention.

FIG. 1 is a schematic drawing illustrating a multi-application-oriented user data management method according to the embodiment of the present invention. As shown in FIG. 1, this method comprises:

Step 110, an authorization management application module receives a user authority information.

Wherein, the user enters the user authority information into the authorization management application module. A user terminal comprises a user input device the user input device comprises a touch screen, a keyboard, a soft keyboard, and a sound pick-up and so on.

The user authority information input by user includes a user information, an application information and an authority information. The user information may be user identification (user ID) or other information used to identify users, the application information may be an application identification (application ID) or other information used to identify applications, and the authority information may be application authority corresponding to the user.

Step 120, the authorization management application module sends the user authority information to a platform server.

Wherein, the platform server stores different type of data, which comprise the information of users, the information of applications, the relationship information between the users and the applications, the relationship information among the users, the applications and the authorities, that is a set of user authority data.

Step 130, the platform server stores the user authority information as the user authority data.

Wherein, the platform server stores the received user authority information as the user authority data.

Step 140, a first application module receives an access instruction input by the first user.

Wherein, the user may input the access instruction of the first application module via the user input devices of the user terminal.

Step 150, the first application module generates an authority request information according to the access instruction.

Wherein, the authority request information comprises the information of a first application corresponding to the first application module.

Step 160, the platform server or an authority data storage server calls the user authority data of the first application according to the authority request information, and returns the user authority data to the first application module.

Wherein, the platform server calls the user authority data stored in the platform server according to the information of the first application in the authority request information, and returns the user authority data to the first application module.

In this embodiment, the manners for the platform server returning the user authority data to the first application module, comprise:

The first manner is the first application module receives the user authority information pushed by the platform server.

Figure 2:
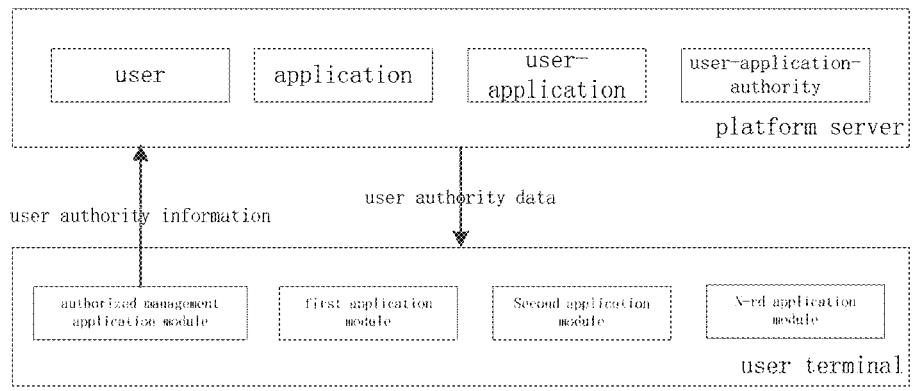
FIG. 2 is a schematic drawing illustrating a multi-application-oriented user data management method according to the first specific implementation of the present invention.

And the process diagram can be show in FIG. 2, in this way, the user authority information is maintained in the platform server, and the platform server pushes the user authority information to the corresponding application module directly. When the user accesses the application, the user authority data are read directly according to the user ID.

The second manner is the first application module sends the authority request information to an authority service management server, and the authority service management server obtains the user authority data from the platform server according to the authority request information.

Figure 3:
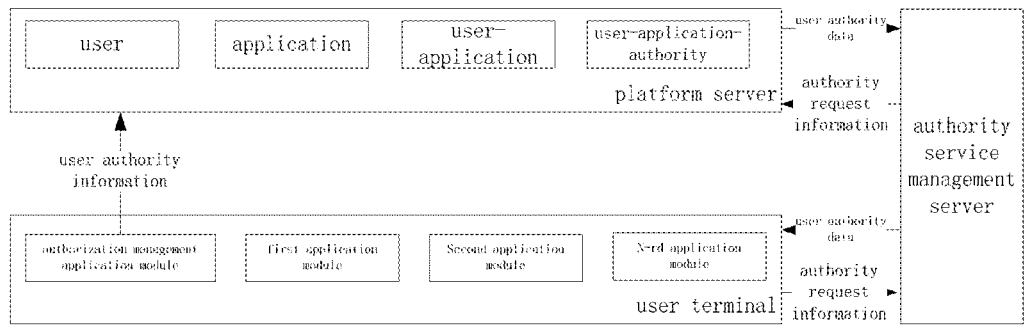
FIG. 3 is a schematic drawing illustrating a multi-application-oriented user data management method according to the second specific implementation of the present invention.

And the process diagram can be show in FIG. 3, in this way, the authority service is provided through the authority service management server. After receiving the authority request information, the authority service management server obtains the user authority data from the platform server, and returns the user authority data to the application module which sends out the authority request information.

The third manner is the platform server pushes the user authority data to the authority data storage server; the first application module sends the authority request information to the authority service management server; and the authority service management server obtains the user authority data from the authority data storage server according to the authority request information.

Figure 4:
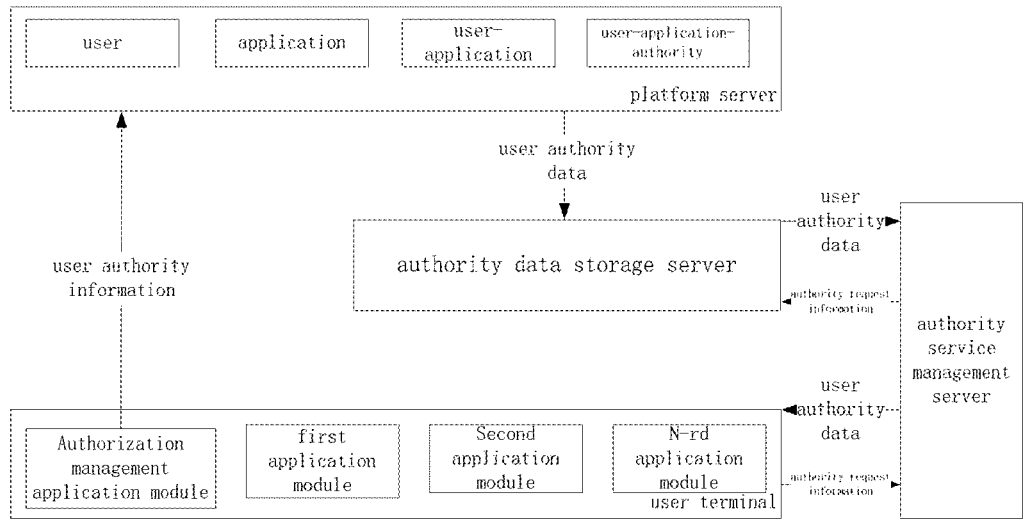
FIG. 4 is a schematic drawing illustrating a multi-application-oriented user data management method according to the third specific implementation of the present invention.

And the process diagram can be show in FIG. 4, in this way, the platform server provides the authority service via the authority service management server. After receiving the authority request information, the authority service management server obtains the user authority data from the authority data storage server, and returns the user authority data to the application module which sends out the authority request information.

Figure 5:
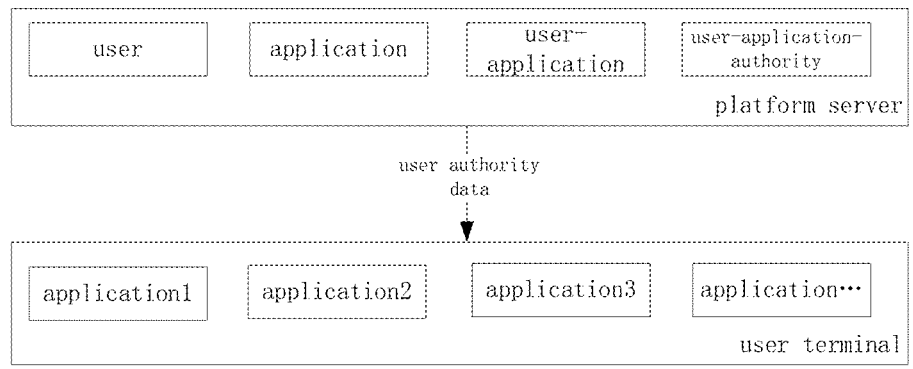
FIG. 5 is a schematic drawing illustrating a multi-application-oriented user data management method according to the forth specific implementation of the present invention.

The present invention further provides a special case, it is that the user terminal is not loading with the authorization management application module. In this case, the first manner is adopted to return the user authority data. And the process diagram may be show in FIG. 5.

Figure 6:
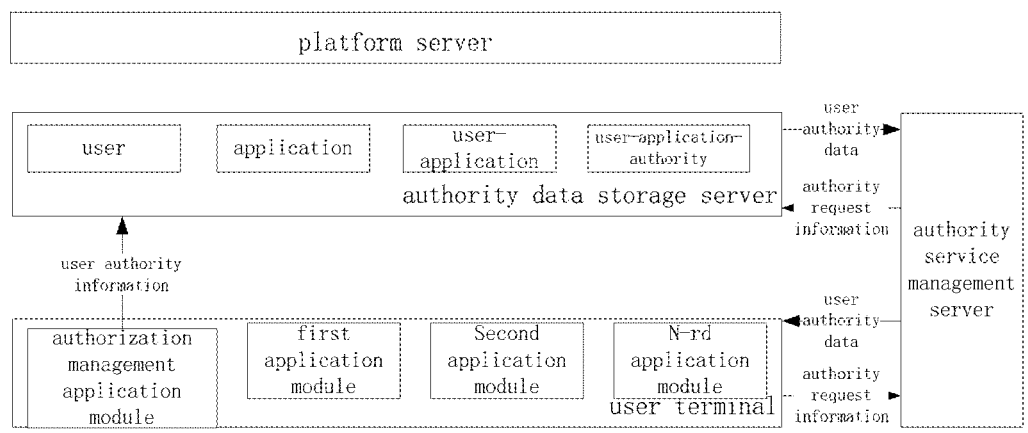
FIG. 6 is a schematic drawing illustrating a multi-application-oriented user data management method according to the fifth specific implementation of the present invention

It is further a case that, the authority data storage server stores the user authority data directly, and the whole scheme is separated from the platform server, the authority data storage server pushes the user authority data to the first application module directly. And the process diagram can be show in FIG. 6.

Step 170, the first application module obtains user data orienting to the first user of the first application according to the user authority data and user information of the first user.

Wherein, after obtaining the user authority data, according to the user information for requesting to access the application, for example the user ID, the first application module combines with the user authority data may obtain the user data orienting to the first user of the first application.

The embodiment of the present invention provides a multi-application-oriented user data management method, which manages an application developed on the base of the same platform, and pushes corresponding data to the application according to the needs of the application, and share data among the applications, therefore it achieves that the application authorities is managed unifiedly. This method solves the problem of the authorization of the discrete applications, and improve the degree of flexibility of the discrete applications, and the number of the authority is reasonably controlled.

Accordingly, the embodiment of the present invention also provides a multi-application-oriented user data management system, and the user data management method provided by the embodiments is operated in the system.

Figure 7:
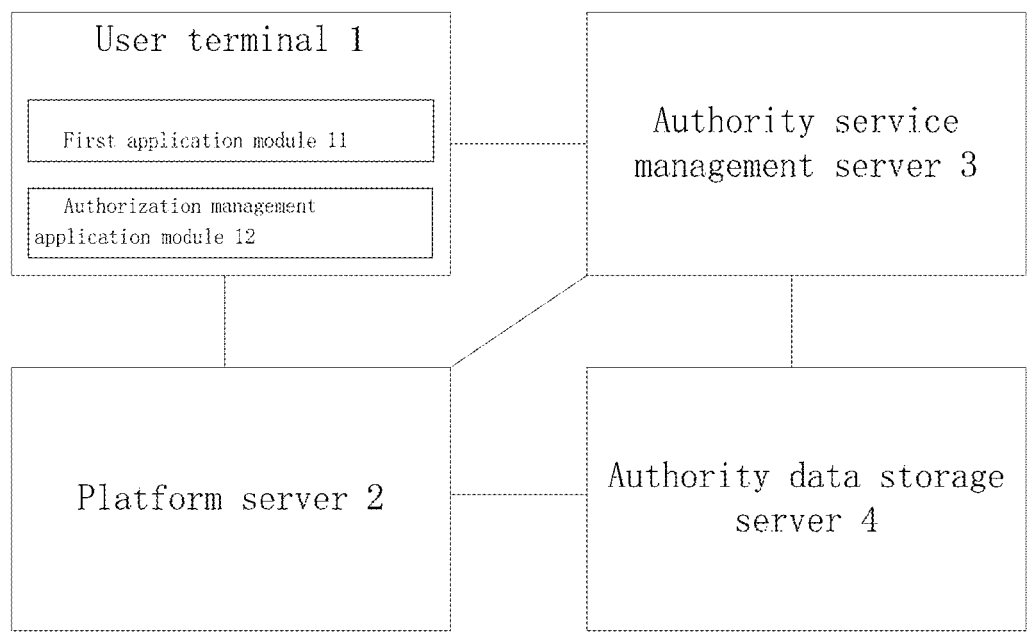
FIG. 7 is a structure schematic drawing illustrating a multi-application-oriented user data management system according to an embodiment of the present invention.

FIG. 7 is a structure schematic drawing illustrating a multi-application oriented user data management system according to an embodiment of the present invention. And the system comprises one or more user terminal(s) 1 and a platform server 2. The user terminal 1 is loading with one or more application module(s), in this embodiment, the first application module 11 is used as specific example. In addition, it may further comprise one or more of the authorization management application module 12 which is loaded on the user terminal, the authority service management server 3 and the authority data storage server 4.

The first application module 11, is configured for receiving the access instruction input by the first user.

The first application module 11, is further configured for generating the authority request information according to the access instruction; the authority request information comprises information of the first application corresponding to the first application module 11.

The platform server 2, is configured for calling the user authority data of the first application according to the authority request information, and returning the user authority data to the first application module 11.

The first application module 11, is further configured for obtaining user data of the first user orient to the first application according to the user authority data and user information of the first user.

In a specific example, the user terminal 1 is further loaded with the authorization management application module 12.

The authorization management application module 12 is configured for receiving the user authority information, and the user authority information comprise the user information, the application information and the authority information.

The authorization management application module 12 is further for sending the user authority information to the platform server 2.

The platform server 2 is further configured for storing the user authority information as the user information data.

In a specific embodiment, the manners for the platform server 2 returning the user authority data to the first application module 11 comprise, The first manner is that the first application module 11 receives the user authority data pushed by the platform server.

The second manner is that the system comprises the authority service management server 3.

The first application module 11 sends the authority request information to the authority service management server 3.

The authority service management server 3 obtains the user authority data from the platform server 2 according to the authority request information.

The third manner is that the system comprises the authority service management server 3 and the authority data storage server 4.

The platform server 2 pushes the user authority data to the authority data storage server 4.

The first application module 11 sends the authority request information to the authority service management server 3.

The authority service management server 4 obtains the user authority data from the authority data storage server 4 according to the authority request information.

There are several specific cases described in the above embodiments of the multi-application-oriented user data management method, and is not repeatedly described here.

The embodiments mentioned above have detailed described the purpose, the technical scheme and the advantage of the present invention. It should be understood that the above is only preferred embodiments of the present invention, but does not limit the protective scope of the present invention, any modification, equivalent replacement or improvement made under the spirit and principles of present invention is included in the protection scope of present invention.

What is claimed is:

1. A method, comprising:
receiving an access instruction input by a user, using an application module,
generating authority request information according to the access instruction, using the application module, wherein the authority request information includes information of an application corresponding to the application module,
calling user authority data of the application according to the authority request information and returning the user authority data to the application module, using a platform server or an authority data storage server, and
obtaining user data of the user of the application according to the user authority data and user information of the user, using the application module;
before receiving the access instruction:
receiving user authority information that comprises user information, application information, and authority information, using an authorization management application module,
sending the user authority information to the platform server or the authority data storage server, using the authorization management application module,
storing the user authority information as the user authority data, using the platform server or the authority data storage server.

2. The method of claim 1; wherein calling and returning the user authority data of is by using the platform server; wherein the method further comprises pushing the user authority information to the application module using the platform server.

3. The method of claim 1; wherein calling and returning the user authority data is by using the platform server; wherein the method further comprises sending the authority request information to an authority service management server using the application module, and obtaining the user authority data from the platform server according to the authority request information, using the authority service management server.

4. The method of claim 1; wherein calling and returning the user authority data is by using the platform server; wherein the method further comprises pushing the user authority data to the authority data storage server using the platform server, sending the authority request information to an authority service management server using the application module, obtaining the user authority data from the authority data storage server according to the authority request information, using the authority service management server.

5. A computer program product comprising a non-transitory computer readable medium having instructions recorded thereon, the instructions when executed by a computer implementing a method comprising: receiving an access instruction input by a user, using an application module, generating authority request information according to the access instruction, using the application module, wherein the authority request information includes information of an application corresponding to the application module, calling user authority data of the application according to the authority request information and returning the user authority data to the application module, using a platform server or an authority data storage server, and obtaining user data of the user of the application according to the user authority data and user information of the user, using the application module; before receiving the access instruction: receiving user authority information that comprises user information, application information, and authority information, using an authorization management application module, sending the user authority information to the platform server or the authority data storage server, using the authorization management application module, storing the user authority information as the user authority data, using the platform server or the authority data storage server.

6. The computer program product of claim 5, wherein calling and returning the user authority data is by using the platform server; wherein the method further comprises pushing the user authority information to the application module using the platform server.

7. The computer program product of claim 5, wherein calling and returning the user authority data is by using the platform server; wherein the method further comprises sending the authority request information to an authority service management server using the application module, and obtaining the user authority data from the platform server according to the authority request information, using the authority service management server.

8. The computer program product of claim 5, wherein calling and returning the user authority data is by using the platform server; wherein the method further comprises pushing the user authority data to the authority data storage server using the platform server, sending the authority request information to an authority service management server using the application module, obtaining the user authority data from the authority data storage server according to the authority request information, using the authority service management server.

* * * * *